US009935853B2

(12) United States Patent
Nataraj et al.

(10) Patent No.: US 9,935,853 B2
(45) Date of Patent: *Apr. 3, 2018

(54) APPLICATION CENTRIC NETWORK EXPERIENCE MONITORING

(71) Applicant: AppDynamics LLC, San Francisco, CA (US)

(72) Inventors: Harish Nataraj, Berkeley, CA (US); Adam Leftik, San Francisco, CA (US); Ajay Chandel, Fremont, CA (US); Jyoti Bansal, San Francisco, CA (US); Bhaskar Sunkara, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,294

(22) Filed: Feb. 20, 2017

(65) Prior Publication Data
US 2017/0163505 A1 Jun. 8, 2017

Related U.S. Application Data

(63) Continuation of application No. 14/815,211, filed on Jul. 31, 2015, now Pat. No. 9,577,900.

(51) Int. Cl.
G06F 15/173 (2006.01)
H04L 12/26 (2006.01)
H04L 12/24 (2006.01)
G06F 11/34 (2006.01)
G06F 11/30 (2006.01)
H04L 29/06 (2006.01)

(52) U.S. Cl.
CPC ........ *H04L 43/062* (2013.01); *G06F 11/3006* (2013.01); *G06F 11/3072* (2013.01); *G06F 11/3419* (2013.01); *G06F 11/3495* (2013.01); *H04L 41/142* (2013.01); *H04L 41/5009* (2013.01); *H04L 41/5035* (2013.01); *H04L 41/5058* (2013.01); *G06F 2201/865* (2013.01); *H04L 67/42* (2013.01)

(58) Field of Classification Search
None
See application file for complete search history.

(56) References Cited

U.S. PATENT DOCUMENTS 7,849,183 B1 * 12/2010 Haber .................. H04L 67/125
709/223
2005/0262237 A1 * 11/2005 Fulton ................. H04L 43/0882
709/224

(Continued)

Primary Examiner — Mohamed Ibrahim
(74) Attorney, Agent, or Firm — Parker Ibrahim & Berg LLC; James M. Behmke; Stephen D. LeBarron

(57) ABSTRACT

A system determines the performance of a network within the context of an application using that network. Network data is collected and correlated with an application that uses the network as well as a distributed transaction implemented by the application. The collected network data is culled, and the remaining data is rolled up into one or more metrics. The metrics, selected network data, and other data are reported in the context of the application that implements part of the distributed transaction. In this manner, specific network performance and architecture data is reported along with application context information.

20 Claims, 11 Drawing Sheets

(56) References Cited

U.S. PATENT DOCUMENTS

2010/0088404 A1* 4/2010 Mani .................. H04L 67/02
                                                709/224
2013/0019008 A1* 1/2013 Jorgenson ........... H04L 41/12
                                                709/224
2014/0297846 A1* 10/2014 Hoja .................. H04L 43/10
                                                709/224

* cited by examiner

APPLICATION CENTRIC NETWORK EXPERIENCE MONITORING

CROSS-REFERENCE TO RELATED APPLICATIONS

This application is a continuation of U.S. patent application Ser. No. 14/815,211, titled "Application Centric Network Experience Monitoring," filed Jul. 31, 2015, the disclosure of which is incorporated herein by reference.

BACKGROUND

The World Wide Web has expanded to provide numerous web services to consumers. The web services may be provided by a web application which uses multiple services and applications to handle a transaction. The applications may be distributed over several machines, making the topology of the machines that provide the service more difficult to track and monitor.

Monitoring a web application helps to provide insight regarding bottle necks in communication, communication failures and other information regarding performance of the services that provide the web application. Most application monitoring tools provide a standard report regarding application performance. Though the typical report may be helpful for most users, it may not provide the particular information that an administrator wants to know.

In particular, application performance management (APM) systems typically only monitor the performance of an application. The APM systems usually do not provide performance details of a particular network over which an application executes. If network information is provided, it is typically only the time that the transaction spends on the network—there is no context or other data regarding the network. What is needed is an APM system that provides application-specific network performance details.

SUMMARY

The present technology determines the performance of a network within the context of an application using that network. Network data is collected and correlated with an application that uses the network as well as a distributed transaction implemented by the application. The collected network data is culled, and the remaining data is rolled up into one or more metrics. The metrics, selected network data, and other data are reported in the context of the application that implements part of the distributed transaction. In this manner, specific network performance and architecture data is reported along with application context information.

An embodiment may include a method for correlating application performance data and network performance data for a distributed transaction. Application data may be collected by a first module installed on a first machine, such that the application data is collected during execution of an application. The application may be one of a plurality of applications on one or more machines that implement a distributed transaction. Network data may be collected for a network by a second module installed on the first machine, such that the network data is collected during execution of the application while implementing a portion of the distributed transaction over the network. The application data and the network data may be correlated using distributed transaction information. The correlated application data and the network data may be reported from a remote server.

An embodiment may include a system for reporting data. The system may include a processor, memory, and one or more modules stored in memory and executable by the processor. When executed, the modules may collect application data by a first module installed on a first machine, the application data collected during execution of an application, the application one of a plurality of applications on one or more machines that implement a distributed transaction, collect network data for a network by a second module installed on the first machine, the network data collected during execution of the application while implementing a portion of the distributed transaction over the network, correlate the application data and the network data using distributed transaction information, and report the correlated application data and the network data from a remote server.

DETAILED DESCRIPTION

The present technology determines the performance of a network within the context of an application using that network. Network data is collected and correlated with an application that uses the network as well as a distributed transaction implemented by the application. The collected network data is culled, and the remaining data is rolled up into one or more metrics. The metrics, selected network data, and other data are reported in the context of the application that implements part of the distributed transaction. In this manner, specific network performance and architecture data is reported along with application context information.

To provide application context to the network data, business transaction informant is provided to a module, such as an agent, that collects the network data. The network agent receives the distributed transaction information along with an identification of what network data to associate it with. The network agent collects network data, such as network flow group data, and identifies the network group data associated with the distributed transaction information. The network agent then generates metrics from the identified network group data, and transmits the metrics, the associated distributed transaction information, and optionally other data, such as the network group flow data, to a remote controller. The remote controller receives the data from the network agent, receives application metric data from other agents, and correlates the network flow group metrics and application metric data using the distributed transaction information. The controller may report the performance of the application along with network performance data and architecture information to the user for a particular application.

Correlating and reporting application and network performance data together brings relevant network level infrastructure visibility that directly correlates to application performance. The present monitoring is performed from a consumer point of view on a consumer machine, rather than from the point of view of some point on the network, which would not provide an entirely accurate picture of what is occurring from the point of view of the consumer. In some instances, the network monitoring system may be implemented on servers providing the application that executes over the network, and monitors network degradation to determine if the network degradation affects an application.

Figure 1:
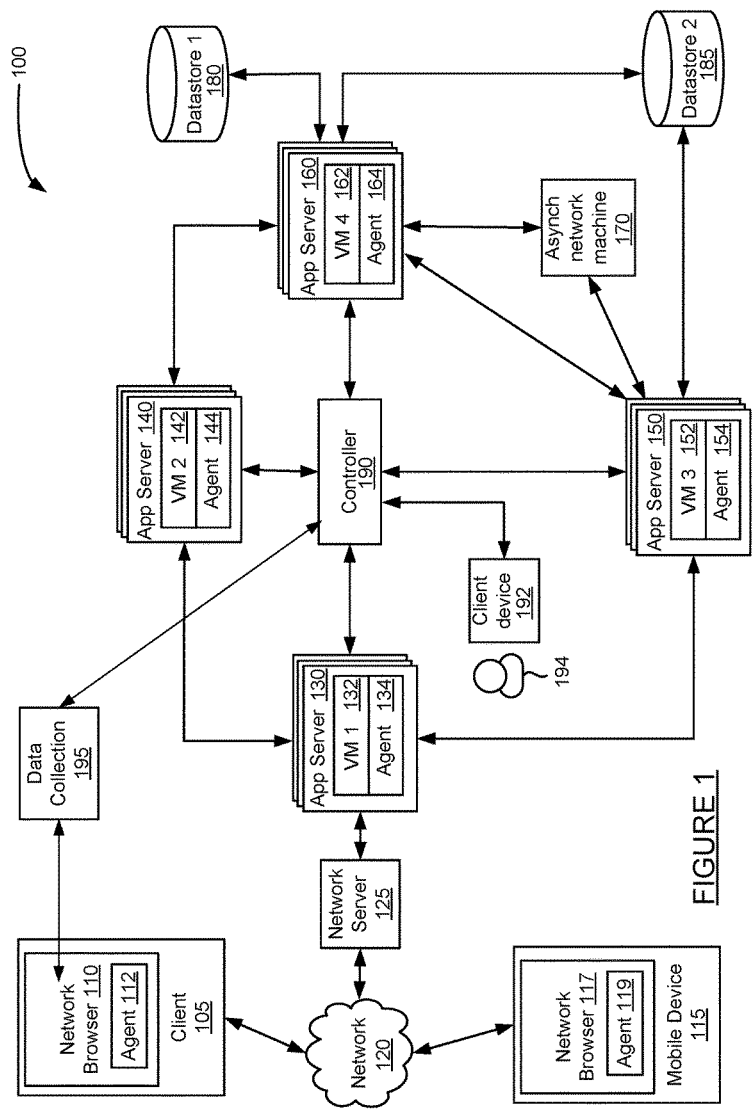
FIG. 1 is a block diagram of a system for correlating an application and network performance data.

FIG. 1 is a block diagram of a system for correlating an application and network performance data. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be installed on network browser 110 and/or client 105 as a network browser add-on, downloading the application to the server, or in some other manner. Agent 112 may be executed to monitor network browser 110, the operation system of client 105, and any other application, API, or other component of client 105. Agent 112 may determine network browser navigation timing metrics, access browser cookies, monitor code, and transmit data to data collection 160, controller 190, or another device. Agent 112 may perform other operations related to monitoring a request or a network at client 105 as discussed herein.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may repot data to data collection server 160 and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks. The network 120 may include one or more machines such as load balance machines and other machines.

Network server 125 is connected to network 120 and may receive and process requests received over network 120. Network server 125 may be implemented as one or more servers implementing a network service, and may be implemented on the same machine as application server 130. When network 120 is the Internet, network server 125 may be implemented as a web server. Network server 125 and application server 130 may be implemented on separate or the same server or machine.

Application server 130 communicates with network server 125, application servers 140 and 150, and controller 190. Application server 130 may also communicate with other machines and devices (not illustrated in FIG. 1). Application server 130 may host an application or portions of a distributed application. The host application 132 may be in one of many platforms, such as including a Java, PHP, .NET, Node.JS, be implemented as a Java virtual machine, or include some other host type. Application server 130 may also include one or more agents 134 (i.e. "modules"), including a language agent, machine agent, and network agent, and other software modules. Application server 130 may be implemented as one server or multiple servers as illustrated in FIG. 1.

Application 132 and other software on application server 130 may be instrumented using byte code insertion, or byte code instrumentation (BCI), to modify the object code of the application or other software. The instrumented object code may include code used to detect calls received by application 132, calls sent by application 132, and communicate with agent 134 during execution of the application. BCI may also be used to monitor one or more sockets of the application and/or application server in order to monitor the socket and capture packets coming over the socket.

In some embodiments, server 130 may include applications and/or code other than a virtual machine. For example, server 130 may include Java code, .NET code, PHP code, Ruby code, C code or other code to implement applications and process requests received from a remote source.

Agents 134 on application server 130 may be installed, downloaded, embedded, or otherwise provided on application server 130. For example, agents 134 may be provided in server 130 by instrumentation of object code, downloading the agents to the server, or in some other manner. Agents 134 may be executed to monitor application server 130, monitor code running in a or a virtual machine 132 (or other program language, such as a PHP, .NET, or C program), machine resources, network layer data, and communicate with byte instrumented code on application server 130 and one or more applications on application server 130.

Each of agents 134, 144, 154 and 164 may include one or more agents, such as a language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket. Agents are discussed in more detail below with respect to FIG. 2.

Agent 134 may detect operations such as receiving calls and sending requests by application server 130, resource usage, and incoming packets. Agent 134 may receive data, process the data, for example by aggregating data into metrics, and transmit the data and/or metrics to controller 190. Agent 134 may perform other operations related to monitoring applications and application server 130 as discussed herein. For example, agent 134 may identify other applications, share business transaction data, aggregate detected runtime data, and other operations.

An agent may operate to monitor a node, tier or nodes or other entity. A node may be a software program or a hardware component (memory, processor, and so on). A tier of nodes may include a plurality of nodes which may process a similar business transaction, may be located on the same server, may be associated with each other in some other way, or may not be associated with each other.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application no. U.S. patent application Ser. No. 12/878,919, titled "Monitoring Distributed Web Application Transactions," filed on Sep. 9, 2010, U.S. Pat. No. 8,938,533, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and agents. Each application may run on the corresponding application server. Each of applications 142, 152 and 162 on application servers 140-160 may operate similarly to application 132 and perform at least a portion of a distributed business transaction. Agents 144, 154 and 164 may monitor applications 142-162, collect and process data at runtime, and communicate with controller 190. The applications 132, 142, 152 and 162 may communicate with each other as part of performing a distributed transaction. In particular each application may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive application data, including data associated with monitoring client requests at client 105 and mobile device 115, from data collection server 160. In some embodiments, controller 190 may receive application monitoring data and network data from each of agents 112, 119, 134, 144 and 154. Controller 190 may associate portions of business transaction data, communicate with agents to configure collection of data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, work station or other computing device. Client computer 192 may communicate with controller 190 to create and view a custom interface. In some embodiments, controller 190 provides an interface for creating and viewing the custom interface as content page, e.g. a web page, which may be provided to and rendered through a network browser application on client device 192.

Applications 132, 142, 152 and 162 may be any of several types of applications. Examples of applications that may implement applications 132-162 include a Java, PHP, .Net, Node.JS, and other applications.

Figure 2:
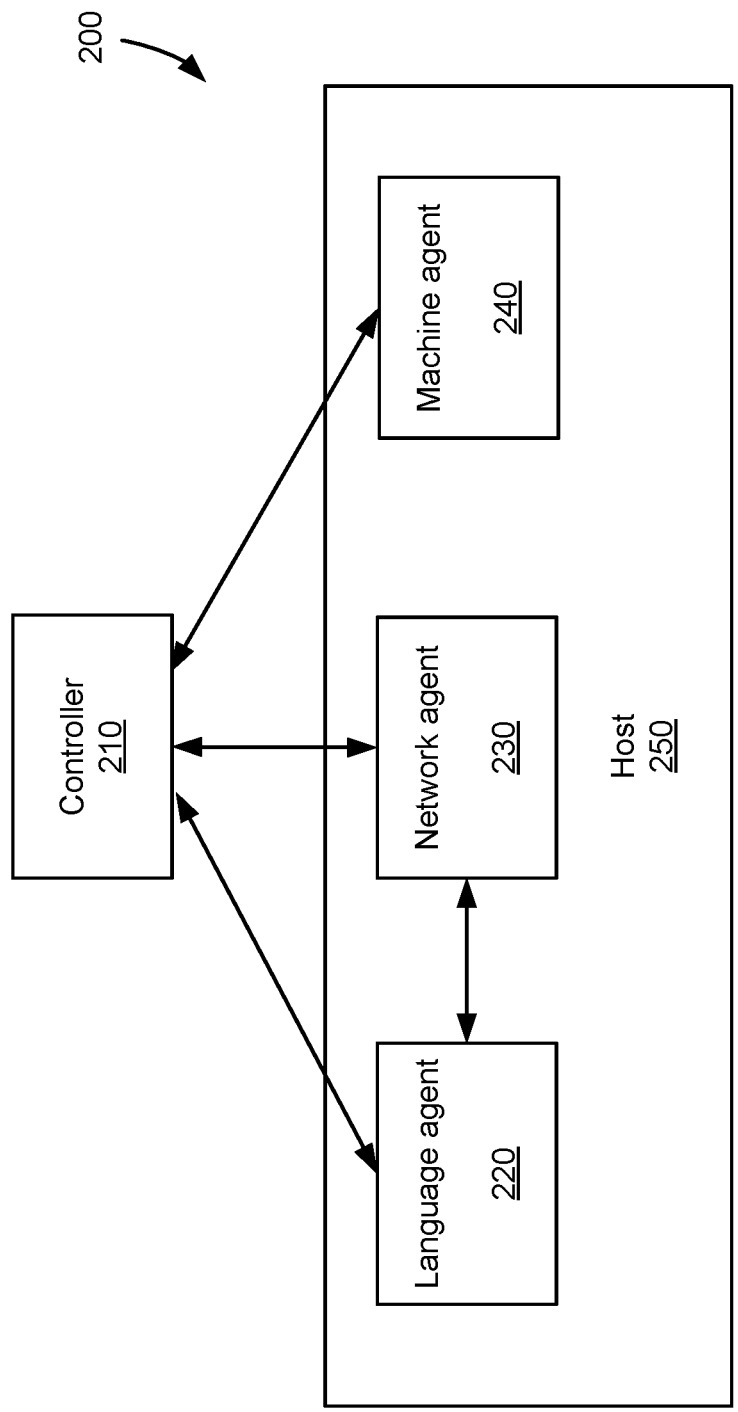
FIG. 2 is a block diagram of a host which implements a standalone network agent.

FIG. 2 is a block diagram of a host which implements a standalone network agent. Host 250 may be implemented as a virtual machine, or an application of some type, such as a PHP application, or any other node capable of being monitored by an agent. Host 250 includes language agent 220, network agent 230, and machine agent 240. Language agent 220 may be an agent suitable to instrument or modify, collect data from, and reside on a host. The host may be a Java, PHP, .Net, Node.JS, or other type of platform. Language agent 220 may collect flow data as well as data associated with the execution of a particular application. The language agent may instrument the lowest level of the application to gather the flow data. The flow data may indicate which tier is communicating which with which tier and on which port. In some instances, the flow data collected from the language agent includes a source IP, a source port, a destination IP, and a destination port. The language agent may report the application data and call chain data to a controller. The language agent may report the collected flow data associated with a particular application to network agent 230.

Network agent 230 may be a standalone agent that resides on the host and collects network flow group data. The network flow group data may include a source IP, destination port, destination IP, and protocol information for network flow received by an application on which network agent 230 is installed. The network agent 230 may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then reports the metrics, flow group data, and call chain data to a controller. The network agent 230 may also make system calls at an application server to determine system information, such as for example a host status check, a network status check, socket status, and other information.

A machine agent 240 may reside on the host 250 and collect information regarding the machine which implements the host. A machine agent may collect and generate metrics from information such as processor usage, memory usage, and other hardware information.

Each of the language agent 220, network agent 230, and machine agent 240 may report data to the controller 210. Controller 210 may be implemented as a remote server that communicates with agents 220-240. The controller 210 may receive metrics call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Figure 3:
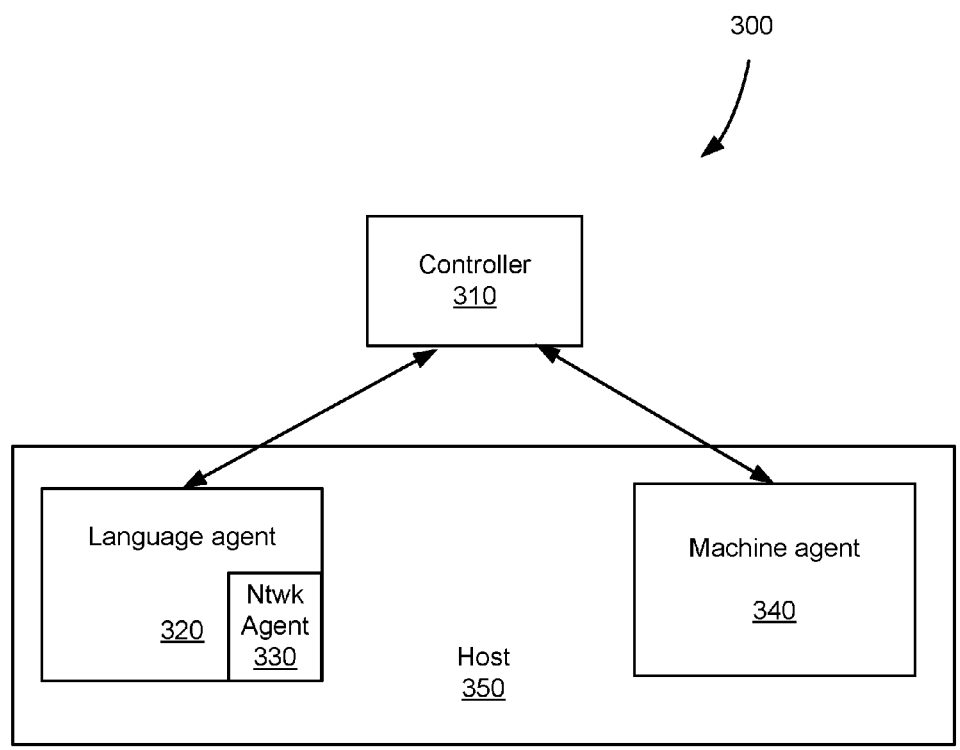
FIG. 3 is a block diagram of a host that implements a plug-in network agent.

FIG. 3 is a block diagram of a host that implements a plug-in network agent. Host 350 includes language agent 320, network agent 330, and machine agent 340. Network agent 330 may be implemented as a plug-in module that is installed onto language agent 320. The network agent 330 operates similarly to network agent 230, but is installed in an agent rather than directly on the host.

Figure 4:
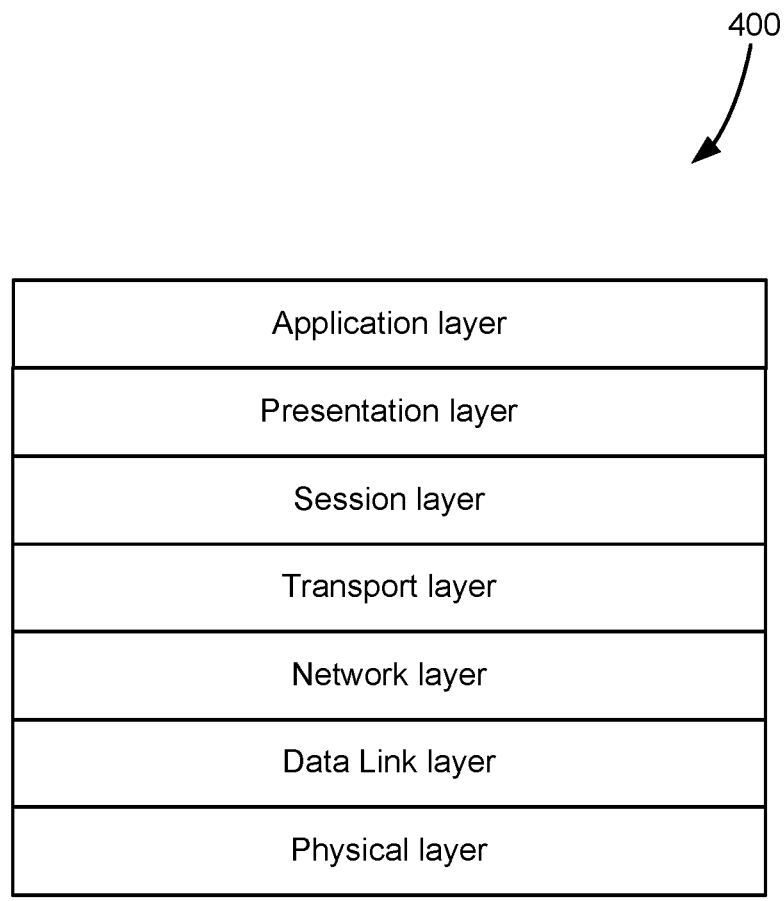
FIG. 4 is a block diagram of an open system interconnection model.

FIG. 4 is a block diagram of an open system interconnection module. The open systems interconnection model (OSI model) is a conceptual model that characterizes and standardizes the communication functions of a computing system. The seven layers of the model include a physical layer, data link layer, network layer, transport layer, session layer, presentation layer, and application layer. Language agents may collect data by monitoring an application layer. Network agents may collect data by monitoring a network layer, for example by monitoring a socket to collect the network layer data as it comes in over the socket. The different layers are monitored from a consumer device rather than the network in order to obtain the most accurate information from the point of view of the consumer.

Figure 5:
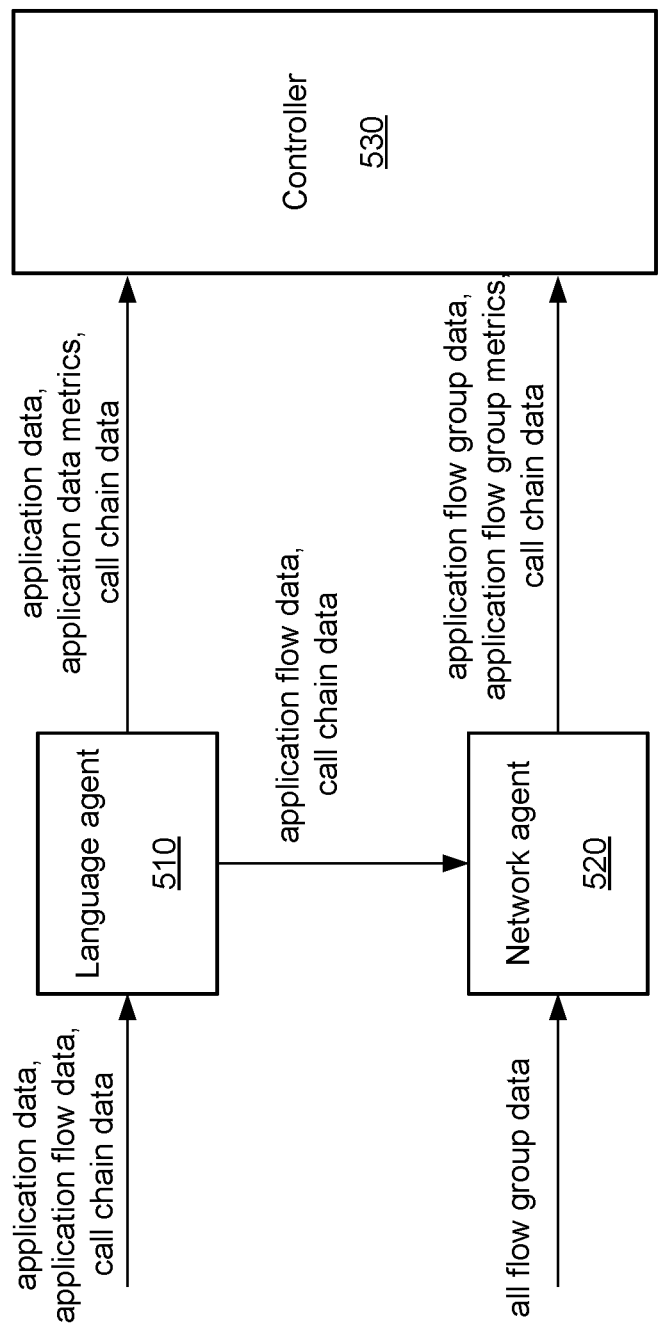
FIG. 5 is a block diagram of data flow from an application and network performance monitoring system.

FIG. 5 is a block diagram of a data flow for an application and network performance monitoring system. The block diagram of FIG. 5 includes language agent 510, network agent 520, and controller 530. Language agent 510 provides data to controller 530 and network agent 520. Network agent 520 provides data to controller 530. Language agent 510 receives application data from an application being monitored, application flow data from messages received by the application, and call chain data. Language agent 510 creates metrics from the application data and reports the application flow data and call chain data to the network agent 520. Language agent 510 also reports the application data, application data metrics, and call chain data to the controller 530. The application data and metrics are associated with a particular distributed transaction through the call chain data which specifies a particular sequence of machines that process a distributed transaction.

Network agent 520 receives network flow group data through packet capture performed while monitoring a socket. The network agent then generates metrics from the flow group data for flows that correspond to the application flow data received from the language agent 510. Network agent 520 then reports the metrics as well as the flow group data associated with a particular application to the controller along with the call chain data. The controller receives the data from the language agent and network agent and correlates it together as a distributed transaction based on the call chain data associated with the distributed transaction.

Figure 6:
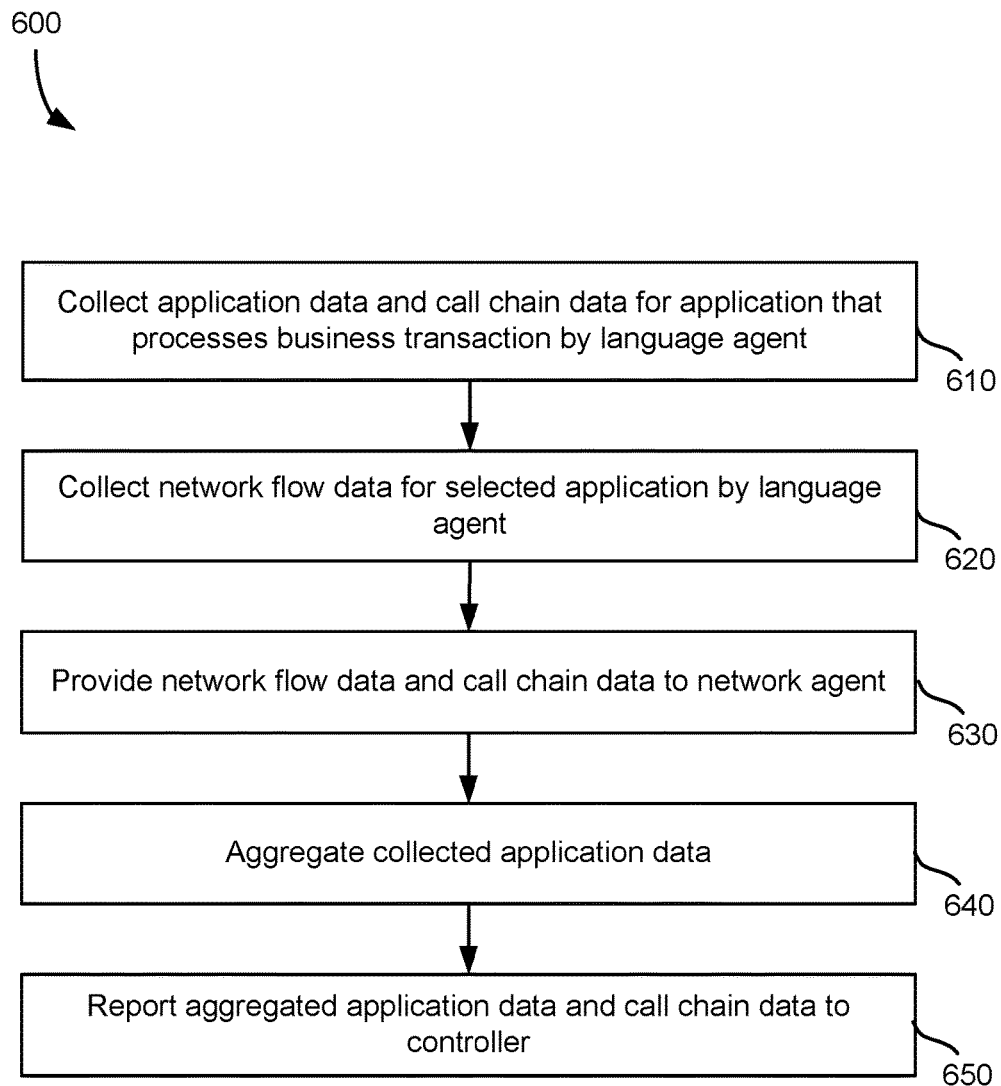
FIG. 6 is a method for providing a language agent in a monitoring system.

FIG. 6 is a method for providing a language agent in a monitoring system. First, application data and call chain data may be collected for an application that processes business transactions by a language agent at step 610. The call chain data may include a series of machines and services that have previously processed an application transaction.

Network flow data is collected for selected applications by a language agent at step 620. The network flow data may include a tuple of source IP, source port, destination IP, and destination port data. This data is collected as a time series of tuples by monitoring the deepest levels of an application by the language agent.

Network flow data and call chain data are provided to a network agent at step 630. The network flow data and call chain data may be provided periodically, upon request of the network agent, or based on another event. The collected application data is an aggregated by the language agent at step 640. The data may be aggregated into a series of metrics, such as response time, average time, and other data. Next, the aggregated application data and call chain data may be reported to a controller by the language agent at step 650. The reported data is associated with a call chain, and is used to correlate with other reported data, such as network flow data and architecture data, at a controller.

Figure 7:
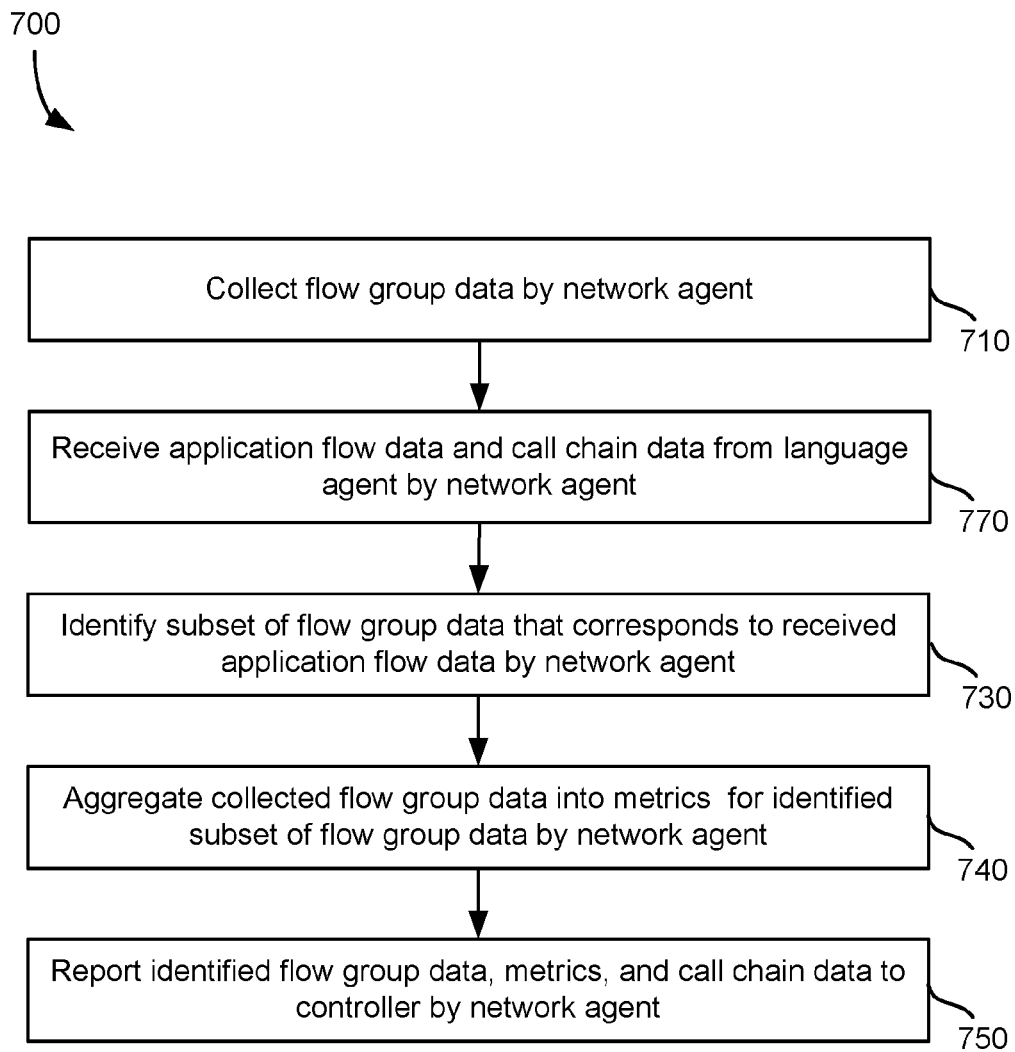
FIG. 7 is a method for providing a network agent in a monitoring system.

FIG. 7 is a method for providing a network agent in a monitoring system. Network flow group and network infrastructure data is collected by a network agent at step 710. The data may be collected at a socket and includes network layer data such as source IP, destination port, destination IP, and protocol data. Application flow data and call chain data are received from a language agent by the network agent at step 770. The call chain data and application flow data may be used by the network agent to identify flow group data for processing and reporting b to a controller y the network agent.

A subset of the network data collected by the network agent is identified at step 730. The subset of flow group data that is collected corresponds to application flow data received by the network agent from the language agent. Hence, the network agent identifies flow group data received over a socket that matches flow data received from the language agent. Next, the identified network flow group data is aggregated into metrics by the network agent. Flow group data not matching the flow data is discarded, while matching flow group data is kept and rolled into one or more metrics by the network agent. The metrics may include TCP throughput, TCP packet loss, latency, bandwidth, and other metrics. After aggregating the metrics, the identified network flow group data and network infrastructure data, metrics, and call chain data may be reported to the controller by the network agent. The data may be reported periodically, in response to a request by a controller, or based on some other event.

Figure 8:
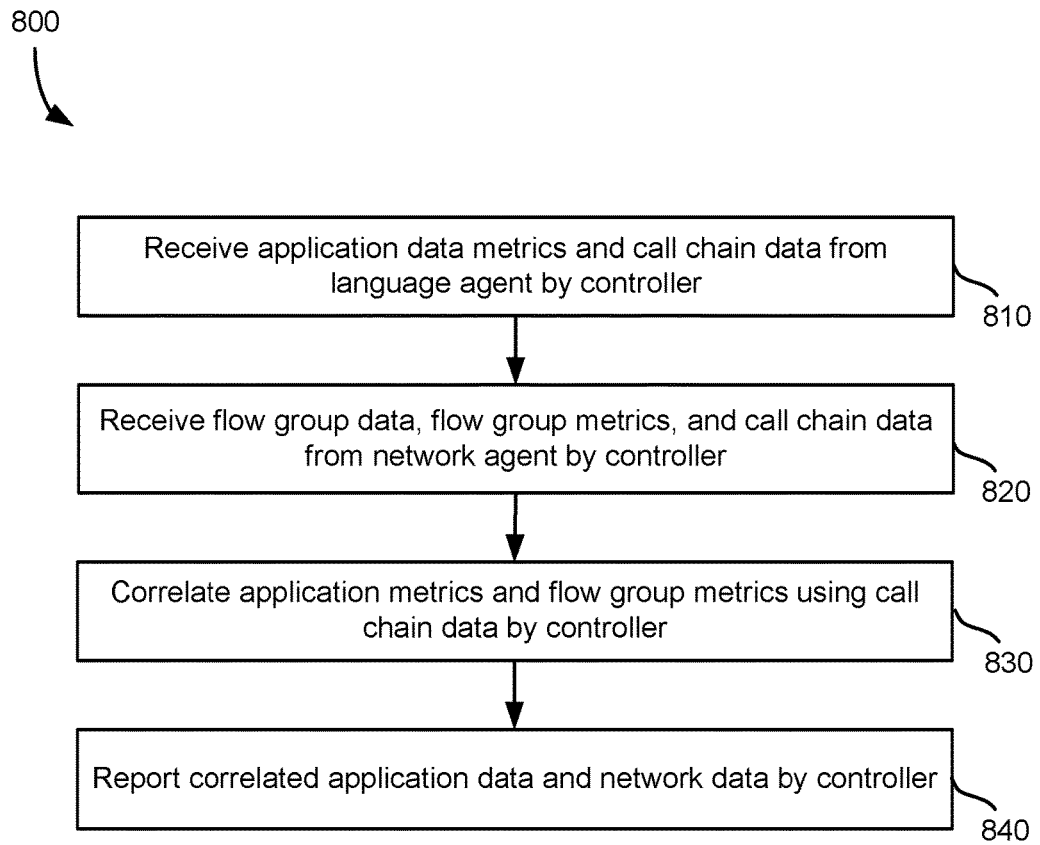
FIG. 8 is a method for providing a controller and a monitoring system.

FIG. 8 is a method for providing a controller and a monitoring system. First, application data metrics and call chain data are received from a language agent by a controller at step 810. Next, flow group data, flow group metrics and call chain data may be received from a network agent by the controller at step 820. The application metrics and flow group metrics may then be correlated using the call chain data by the controller at step 830. The correlated application data and network data may then be reported to a user by a controller at step 840. Reporting the correlated application data is discussed in more detail below with respect to FIG. 9.

Figure 9:
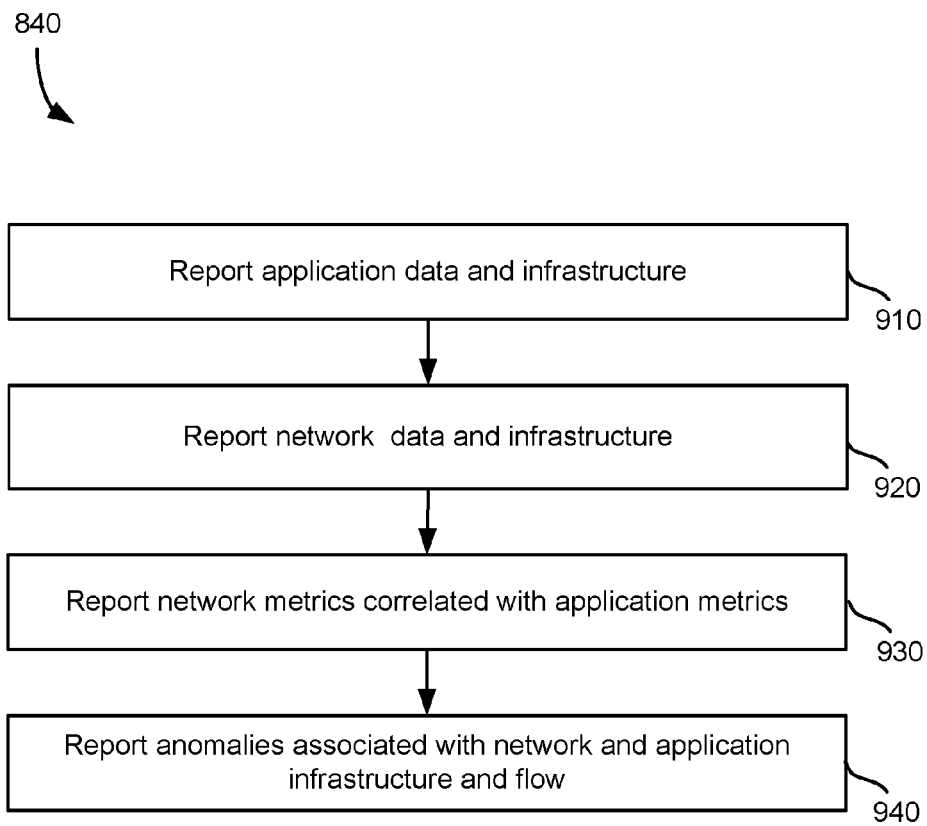
FIG. 9 is a method for reporting correlated application data and network data.

FIG. 9 is a method for reporting correlated application data and network data. Application data and application infrastructure data is reported to a user at step 910. The application data and infrastructure information may include an identification of the nodes, the application ID, and other information regarding an application. Network data and network infrastructure information may be reported at step 920. The network infrastructure may include the nodes from which a message is sent and received, as well as any intermediary machines, such as a load balancer. Network metrics correlated with the application metrics may then be reported at step 930. The metrics may include the performance of an application within the distributed transaction as well as the performance of the network that carried out the distributed transaction. An example of reporting network metrics correlated with application metrics is provided in the interface of FIG. 10.

Figure 10:
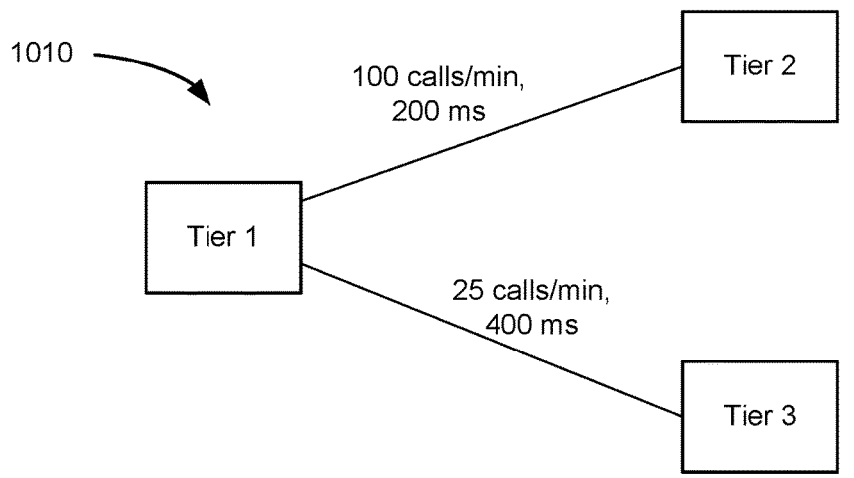
FIG. 10 is an example of reporting application data and correlated network data.
Figure 10:
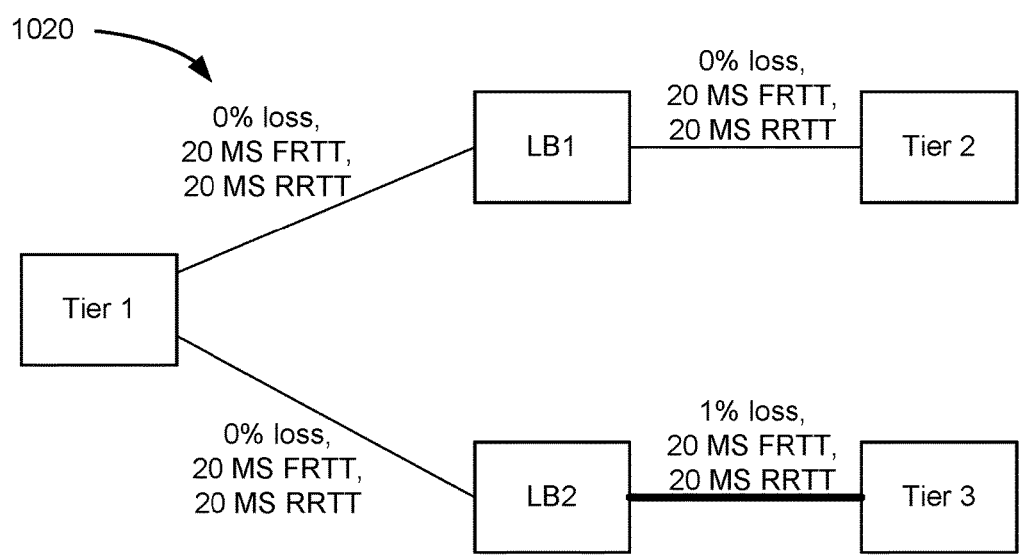

FIG. 10 includes a first graphical interface 1010 which shows application data and metric information. Interface 1010 illustrates tier 1 in communication with tier 2 and tier 3. The connection between tier 1 and tier 2 has metrics of 100 calls per minute and an average response time of 200 MS. The application metrics between tier 1 and tier 3 include an average of 25 calls per minute with an average response time of 400 MS for the application called between tier 1 and tier 3.

Interface 1020 illustrates network infrastructure and metric information. Between tier 1 and tier 2, the infrastructure of the network includes load balancer one. Between tier 1 and load balancer one, the metrics displayed are a 0% loss, a 20 MS FRTT, and a 20 MS RRTT. The network metrics between load balancer one and tier 2 also include a 0% loss, a 20 MS FRTT, and a 20 MS RRTT. The network metrics between tier 1 and load balancer two, which is determined to exist between tier 1 and tier 3, include a 0% loss, a 20 MS FRTT, and a 20 MS RRTT. The network metrics between load balancer two and tier 3 include a 1% loss, a 20 MS FRTT, and a 20 MS RRTT. Because the percentage loss of data or packets between load balancer two and tier 3 is greater than an acceptable amount, the line representing the network path between load balancer two and tier 3 is highlighted as a thick FIGURE line than the other network paths. If a user were to select the particular network path associated with the 1% loss metric, the interface could provide the user with additional data associated with the particular flow from which the metrics were derived.

The application-based graphic 1010 and network-based graphic 1020 provide performance data for a particular distributed transaction, and are thereby correlated to each other. In particular, the application data and network data is provided for a portion of a distributed transaction that occurs between nodes 1 and nodes 2 and 3.

Figure 11:
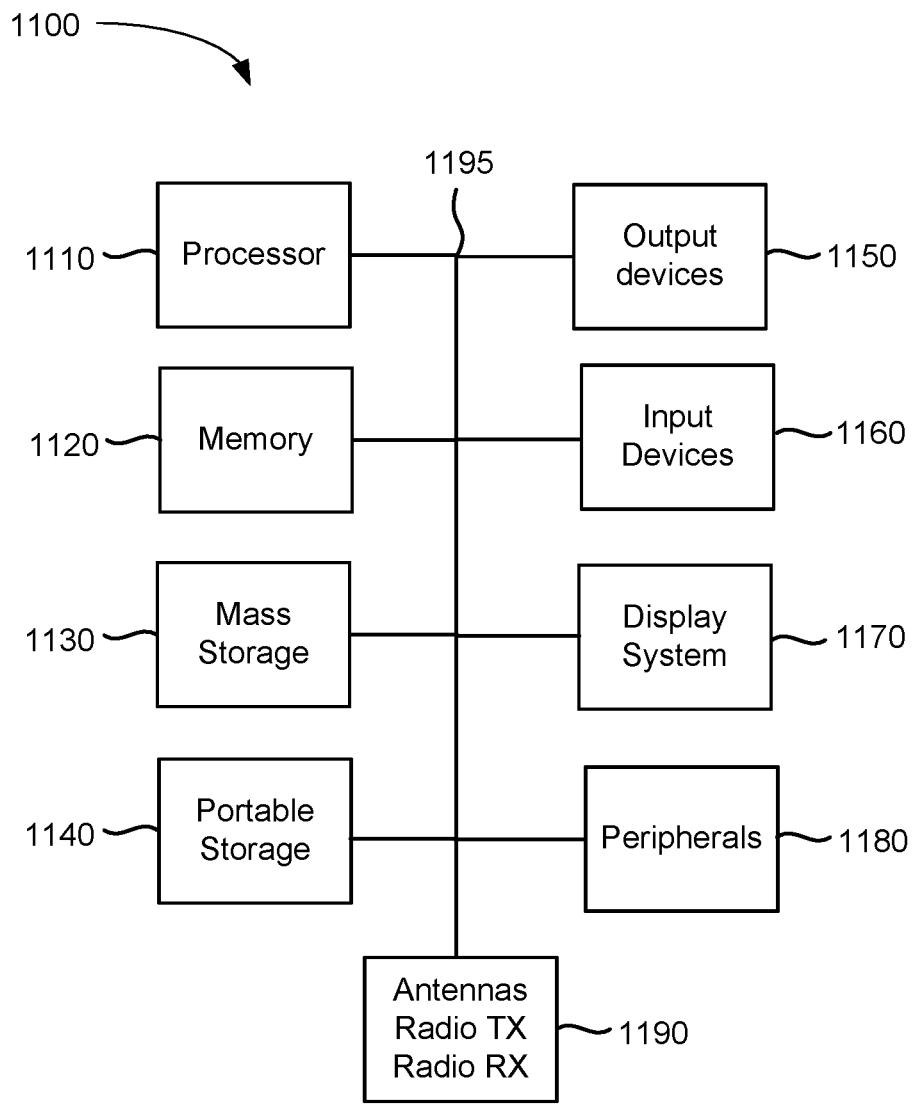
FIG. 11 is a block diagram of a computing environment for implementing the present technology

FIG. 11 is a block diagram of a system for implementing the present technology. System 1100 of FIG. 11 may be implemented in the contexts of the likes of client computer 105 and 192, servers 125, 130, 140, 150, and 160, machine 170, data stores 180 and 190, and controller 190. The computing system 1100 of FIG. 11 includes one or more processors 1110 and memory 1120. Main memory 1120 stores, in part, instructions and data for execution by processor 1110. Main memory 1120 can store the executable code when in operation. The system 1100 of FIG. 11 further includes a mass storage device 1130, portable storage medium drive(s) 1140, output devices 1150, user input devices 1160, a graphics display 1170, and peripheral devices 1180.

The components shown in FIG. 11 are depicted as being connected via a single bus 1190. However, the components may be connected through one or more data transport means. For example, processor unit 1110 and main memory 1120 may be connected via a local microprocessor bus, and the mass storage device 1130, peripheral device(s) 1180, portable storage device 1140, and display system 1170 may be connected via one or more input/output (I/O) buses.

Mass storage device 1130, which may be implemented with a magnetic disk drive, an optical disk drive, a flash drive, or other device, is a non-volatile storage device for storing data and instructions for use by processor unit 1110. Mass storage device 1130 can store the system software for implementing embodiments of the present invention for purposes of loading that software into main memory 1120.

Portable storage device 1140 operates in conjunction with a portable non-volatile storage medium, such as a floppy disk, compact disk or Digital video disc, USB drive, memory card or stick, or other portable or removable memory, to input and output data and code to and from the computer system 1100 of FIG. 11. The system software for implementing embodiments of the present invention may be stored on such a portable medium and input to the computer system 1100 via the portable storage device 1140.

Input devices 1160 provide a portion of a user interface. Input devices 1160 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 1100 as shown in FIG. 11 includes output devices 1150. Examples of suitable output devices include speakers, printers, network interfaces, and monitors.

Display system 1170 may include a liquid crystal display (LCD) or other suitable display device. Display system 1170 receives textual and graphical information, and processes the information for output to the display device. Display system 1170 may also receive input as a touch-screen.

Peripherals 1180 may include any type of computer support device to add additional functionality to the computer system. For example, peripheral device(s) 1180 may include a modem or a router, printer, and other device.

The system of 1100 may also include, in some implementations, antennas, radio transmitters and radio receivers 1190. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth devices, and other radio frequency networks. The devices may include one or more radio transmitters and receivers for processing signals sent and received using the antennas.

The components contained in the computer system 1100 of FIG. 11 are those typically found in computer systems that may be suitable for use with embodiments of the present invention and are intended to represent a broad category of such computer components that are well known in the art. Thus, the computer system 1100 of FIG. 11 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, C, C++, Node.JS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for correlating application performance data and network performance data for a distributed transaction over a network, comprising:
   collecting application data by a first module installed on a first machine, the application data collected during execution of an application implemented as part of the distributed transaction;
   receiving, by a second module installed on the first machine, the application data collected during execution of the application while implementing at least a portion of the distributed transaction;
   collecting network data associated with network flow by the second module installed on the first machine;
   identifying, by the second module, a subset of the collected network data which corresponds to the application data received from the first module;
   generating, by the second module, flow metrics from the identified subset; and
   transmitting, by the second module, the identified subset and the flow metrics to a remote controller on a second machine, wherein the remote controller correlates application metrics received from the first module with the flow metrics received from the second module using distributed transaction information, and reports results of the correlation as an indication of network performance within a context of the application during execution from a remote server.

2. The method of claim 1, wherein the distributed transaction information includes call chain data collected within the context of the application during execution.

3. The method of claim 2, wherein the call chain data includes a sequence of one or more nodes that have previously processed the distributed business transaction.

4. The method of claim 3, including:
   receiving, by the second module, the network flow tuple and distributed transaction information;
   generating, by the second module, metrics for network flow group data that matches the received network flow tuple; and
   reporting the network flow group metrics and the distributed transaction information to the remote controller.

5. The method of claim 1, wherein the first portion of the collected application data includes application flow data and the network data includes network flow data and network infrastructure data.

6. The method of claim 1, wherein the first module is a first agent installed on the first machine and the second module is a second agent or plug-in installed on the first machine.

7. The method of claim 1, including:
   collecting, by the first module, the distributed transaction information from the application being monitored; and
   providing, by the first module, the distributed transaction information to the second module.

8. The method of claim 1, including:
   collecting, by the first module, a network flow tuple for the application; and
   providing, by the first module, the distributed transaction information and the network flow tuple to the second module.

9. The method of claim 1, wherein correlating includes:
   receiving application performance metrics generated from the application data collected by the first module; and
   receiving network performance metrics generated from the network data collected by the second module,
   wherein the remote controller correlates the application performance metrics and network performance metrics using the call chain data that indicate a sequence of machines that have previously processed the distributed transaction are associated with each of the application performance metrics and network performance metrics.

10. A non-transitory computer readable storage medium having embodied thereon a program, the program being executable by a processor to perform a method for correlating application performance data and network performance data for a distributed transaction, the method comprising:
    collecting application data by a first module installed on a first machine, the application data collected during execution of an application implemented as part of the distributed transaction;
    receiving, by a second module installed on the first machine, the application data collected during execution of the application while implementing at least a portion of the distributed transaction;
    collecting network data associated with network flow by the second module installed on the first machine;
    identifying, by the second module, a subset of the collected network data which corresponds to the application data received from the first module;
    generating, by the second module, flow metrics from the identified subset; and
    transmitting, by the second module, the identified subset and the flow metrics to a remote controller on a second machine, wherein the remote controller correlates application metrics received from the first module with the flow metrics received from the second module using distributed transaction information, and reports results of the correlation as an indication of network performance within a context of the application during execution from a remote server.

11. The non-transitory computer readable storage medium of claim 10, wherein the distributed transaction information includes call chain data, the call chain data including a sequence of one or more nodes that have previously processed the distributed business transaction.

12. The non-transitory computer readable storage medium of claim 11, the second module receiving the network flow tuple and distributed transaction information, the second module generating metrics for network flow group data that matches the received network flow tuple and reporting the network flow group metrics and distributed transaction information to a remote controller.

13. The non-transitory computer readable storage medium of claim 10, wherein the network data includes network flow data and network infrastructure data.

14. The non-transitory computer readable storage medium of claim 10, wherein the first module is a first agent installed on the first machine and the second module is a second agent installed on the first machine.

15. The non-transitory computer readable storage medium of claim 10, wherein the first module is a first agent installed on the first machine and the second module is a plug-in installed in the first agent on the first machine.

16. The non-transitory computer readable storage medium of claim 10, wherein the first module collects the distributed transaction information from the application being monitored by the first module, the first module providing the second module with the distributed transaction information.

17. The non-transitory computer readable storage medium of claim 10, wherein the first module collecting a network flow tuple for the application, the first module providing the distributed transaction information and the network flow tuple to the second module.

18. The non-transitory computer readable storage medium of claim 10, wherein correlating includes:
   receiving application performance metrics generated from the application data collected by the first module;
   receiving network performance metrics generated from the network data collected by the second module; and
   wherein the remote controller correlates the application performance metrics and network performance metrics using the call chain data that indicate a sequence of machines that have previously processed the distributed transaction are associated with each of the application performance metrics and network performance metrics.

19. An apparatus, comprising:
   one or more network interfaces to communicate on links within a computer network;
   a processor coupled to the network interfaces and adapted to execute one or more processes; and
   a memory configured to store a process executable by the processor, the process when executed configured to:
      receive, from a first module installed on a first machine at a remote location, application metrics generated by the first module during execution of an application implemented as part of the distributed transaction, wherein the application metrics are generated based on application data is collected by the first module;
      receive flow metrics generated by the second module, wherein the flow metrics are based on a subset of network flow data collected by the second module, and the subset is a portion of the collected network flow data that matches flow data received at the second module from the first module, the flow data collected during execution of the application while implementing at least part of the distributed transaction;
      correlate the application metrics with the flow metrics the using distributed transaction information received from both the first module and the second module; and
      report results of the correlation as an indication of network performance within a context of the application during execution from a remote server.

20. The system of claim 19, wherein the distributed transaction information is call chain data.

* * * * *